(12) United States Patent
Montero et al.

(10) Patent No.: US 7,032,174 B2
(45) Date of Patent: Apr. 18, 2006

(54) AUTOMATICALLY ADDING PROPER NAMES TO A DATABASE

(75) Inventors: Jose Luis Montero, Seattle, WA (US); Jeff Reynar, Woodinville, WA (US); Devika Ghaisas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 09/818,157

(22) Filed: Mar. 27, 2001

(65) Prior Publication Data

US 2002/0143828 A1 Oct. 3, 2002

(51) Int. Cl.
G06F 17/21 (2006.01)
G06F 17/24 (2006.01)

(52) U.S. Cl. .................. 715/533; 715/530; 715/531; 715/532; 715/534; 715/540; 707/1; 707/2; 707/3; 707/6

(58) Field of Classification Search ............... 715/530, 715/531, 532, 533, 534, 540; 707/1, 2, 3, 707/6
See application file for complete search history.

(56) References Cited

U.S. PATENT DOCUMENTS

| | | | |
|---|---|---|---|
| 4,674,065 A | 6/1987 | Lange et al. ............... 364/900 |
| 4,868,750 A | 9/1989 | Kucera et al. ................. 704/8 |
| 5,020,019 A | 5/1991 | Ogawa ....................... 364/900 |
| 5,128,865 A | 7/1992 | Sadler ........................... 704/2 |
| 5,267,155 A | 11/1993 | Buchanan et al. ..... 364/419.14 |
| 5,337,233 A | 8/1994 | Hofert et al. ............... 715/540 |
| 5,351,190 A | 9/1994 | Kondo ........................... 704/8 |
| 5,392,386 A | 2/1995 | Chalas ........................ 395/155 |
| 5,541,836 A | 7/1996 | Church et al. ................. 704/7 |
| 5,657,259 A | 8/1997 | Davis et al. ................ 708/204 |
| 5,761,689 A * | 6/1998 | Rayson et al. ............... 715/533 |
| 5,781,904 A | 7/1998 | Oren et al. .................. 707/100 |
| 5,805,911 A * | 9/1998 | Miller ......................... 715/534 |
| 5,815,830 A | 9/1998 | Anthony ........................ 707/6 |
| 5,855,007 A | 12/1998 | Jovicic et al. ................ 705/14 |
| 5,859,636 A | 1/1999 | Pandit ......................... 345/335 |
| 5,875,443 A * | 2/1999 | Nielsen ......................... 707/2 |

(Continued)

OTHER PUBLICATIONS

*Microsoft Computer Dictionary*, Microsoft, Microsoft Press, Fifth Edition, p. 409.

(Continued)

*Primary Examiner*—Stephen Hong
*Assistant Examiner*—Joshua D. Campbell
(74) *Attorney, Agent, or Firm*—Merchant & Gould

(57) ABSTRACT

The correct spelling of resolved email names is automatically stored in a custom dictionary. Thereafter, a spell checker will recognize the name during the spell checking process, because the name is stored in the custom dictionary and the name will not be incorrectly marked as a spelling error. When an email editor resolves an entered email name, the email editor checks an address book or email name cache to determine whether there is an email address and/or an email display name corresponding to the name. The display name will be used to replace the email name that the user entered into the TO field. Once an email name has been resolved and the display name is provided in the TO field, the email editor will make the name available for adding to a custom dictionary. Once the display name string has been added to the custom dictionary, the email editor and any other client of the custom dictionary (e.g., a word processor) will recognize the name as being properly spelled and the name will not be incorrectly identified as a misspelled word. Additionally, the display name string can be added to any other repository of text strings, such as an auto-completion database and a smart-tags database.

24 Claims, 10 Drawing Sheets

U.S. PATENT DOCUMENTS

| | | | |
|---|---|---|---|
| 5,892,919 A * | 4/1999 | Nielsen | 709/228 |
| 5,895,461 A | 4/1999 | De La Huerga et al. | 707/1 |
| 5,896,321 A * | 4/1999 | Miller et al. | 365/189.01 |
| 5,900,004 A | 5/1999 | Gipson | 707/530 |
| 5,920,859 A | 7/1999 | Li | 707/5 |
| 5,946,647 A | 8/1999 | Miller et al. | 704/9 |
| 5,974,413 A | 10/1999 | Beauregard et al. | 707/6 |
| 6,028,605 A | 2/2000 | Conrad et al. | 345/840 |
| 6,085,201 A | 7/2000 | Tso | 707/505 |
| 6,108,674 A | 8/2000 | Murakami et al. | 707/515 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,154,738 A | 11/2000 | Call | 707/4 |
| 6,185,550 B1 | 2/2001 | Snow et al. | 707/1 |
| 6,185,576 B1 | 2/2001 | McIntosh | 707/200 |
| 6,272,505 B1 | 8/2001 | De La Huerga | 707/501 |
| 6,292,768 B1 | 9/2001 | Chan | 704/1 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,338,059 B1 | 1/2002 | Fields et al. | 707/4 |
| 6,438,545 B1 | 8/2002 | Beauregard et al. | 707/6 |
| 6,516,321 B1 | 2/2003 | De La Huerga | 707/102 |
| 6,519,603 B1 | 2/2003 | Bays et al. | 707/102 |
| 6,556,984 B1 * | 4/2003 | Zien | 707/2 |
| 6,571,241 B1 | 5/2003 | Nosohara | 707/6 |
| 6,618,733 B1 | 9/2003 | White et al. | 707/103 |
| 6,625,581 B1 | 9/2003 | Perkowski | 705/27 |
| 6,629,079 B1 | 9/2003 | Spiegel et al. | 705/26 |
| 6,697,824 B1 | 2/2004 | Bowman-Amuah | 709/229 |
| 6,732,090 B1 | 5/2004 | Shanahan et al. | 715/515 |
| 6,732,361 B1 | 5/2004 | Andreoli et al. | 719/313 |
| 2002/0035581 A1 | 3/2002 | Reynar et al. | 707/513 |
| 2002/0065891 A1* | 5/2002 | Malik | 709/206 |
| 2002/0091803 A1* | 7/2002 | Imamura et al. | 709/220 |
| 2002/0184247 A1 | 12/2002 | Jokela et al. | 707/204 |
| 2003/0154144 A1 | 8/2003 | Pokorny et al. | 705/28 |
| 2003/0212527 A1 | 11/2003 | Moore et al. | 702/179 |

OTHER PUBLICATIONS

*Technique for Automatically Correcting Words in Text*; Karen Kukich; *ACM Comput. Surv.*, 24, 4 (Dec. 1992); pp. 377-439.

*Putting People First: Specifying Proper Names in Speech Interfaces*; Matt Marx and Chris Schmandt; *Proceedings of the ACM Symposium on User Interface Software and Technology*; 1994; pp. 29-37.

*Design methodology and formal validation of hypermedia documents*; C.A.S. Santos, L.F.G Soares, G.L. de Souza and J.P. Courtiat; *Proceedings of the sixth ACM international conference on multimedia*, (1998) p. 3948.

*Constructing, organizing, and visualizing collections of tropically related Web resources*; Loren Terveen, Will Hill and Brian Amento; *ACM Trans. Comput.-um. Interact* 6, 1 (Mar. 1999) p. 67-94.

*How to personalize the Web*; Rob Barrett, Paul P. Maglio and Daniel C. Kellem; *Conference proceedings on human factors in computing systems* (1997) p. 75-82.

*CLUES: dynamic personalized message filtering*; Matthew Marx and Chris Schmandt; *Proceedings of the ACM 1996 conference on computer supported cooperative work* (1996) p. 113-121.

*Dynamic hyperlink generation for navigation in relational databases*; Karl M. Goschka and Jurgen Falb*Proceedings of the tenth ACM conference on hypertext and hypermedia: returning to our diverse roots* (1999) p. 23-24.

*Perceptual user interfaces: perceptual intelligence*; Alex Pentland; *Commun. ACM* 43, 3 (Mar. 2000) p. 35-44.

*Textual context analysis for information retrieval* Mark A. Stairmand; *Proceedings of the 20th annual international ACM SIGIR conference on research and development in information retrieval* (1997) p. 140-147.

*An XML framework for agent-based E-commerce*; Robert J. Glushko, Jay M. Tenenbaum and Bart Meltzer; *Commun. ACM* 42, 3 (Mar. 1999) p. 106.

*Interface and execution models in the fluke kernel*; Bryan Ford, Mike Hibler, Jay Lepreau, Roland McGrath and Patrick Tullman; *Proceedings of the third symposium on operating systems design and implementation*, (1999) p. 101-115.

*Exploring the applications user-expertise assessment for intelligent interfaces*; Michel C. Desmarais and Jiming Liu; *Proceedings of the conference on human factors in computing systems*, (1993) p. 308-313.

*Future directions in user-computer interface software*; James D. Foley; *Conference proceedings on organizational computer systems*, (1991) p. 289-297.

*Human-computer interface development: concepts and systems for its management* H. Rex Hartson and Deborah Hix: *ACM Comput. Surv.* 1 (Mar. 1989) p. 5-92.

*Integrating computer technology, people technology; strategies and case studies from Georgia Tech's Graphics, Visualization and Usability Center*, Jim Foley; *Proceedings of the Workshop on advanced visual interfaces*, (1994) p. 34-43.

*Command management system for next-generation user input*; M. Tsai, P. Reiher and G.J. Popek; *Proceedings of the seventh workshop on hottopics in operating systems*, (1999) p. 17984.

Kuenning, Geoff, "Using ISPELL from Emacs", http://theochem.ki.ku.dk/on_line_docs/ispell_1.html, 4 pp., publication date unknown.

"Spellout Command", Commands Reference, vol. 5, http://www.rz.uni-hohenheim.de/betriebssysteme/unix/aix/aix_4.3.3_doc/base_doc/usr/share/man/inf . . . , 1 page, publication date unknown.

"Chapter 8—Standard Input and Output", http://www.comp.lancs.ac.uk/computing/users/eiamjw/unix/chap8.html, 3 pp., publication date unknown.

Panagiotis, Christias, Man-cgi 1.15, http://www.physics.umn,edu/cgi-bin/man-cgi?spell, 1994, 5 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.

"Module 123—Spell", http://duplex.hypermart.net/books/bsd/501-504.html, 4 pp., publication date unknown.

Panagiotis, Christias, Man-cgi 1.15, http://www.calpoly.edu/cgi-bin/man-cgi?spell+1, 1994, 3 pp.

Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.

Willisson, Pace, Ispell (1), http://www.rt.com/man/findaffix.1.html, 1983, 15 pp.

Willisson, Pace, Ispell (1), "User Commands", http://www.csee.usf.edu/cgi-bin/man-cgi?ispell, 1983, 18 pp.

"Handout 38: Spell Checking, Word Counting, and Textual Analysis", http://courses.cs.emporia.edu/pheattch/courses/2002/cs501s02/hand38/, 3 pp., publication date unknown.

Keunning, Geoff, "International Spell", http://fmg-www.cs.ucla.edu/geoff.ispell.html, 3 pp., publication date unknown.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, pp. 1-19.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester M13 9PL, UK, pp. 1-12, publication date unknown.

IBM Corporation, IBM Research Disclosure #368; "Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

* cited by examiner

AUTOMATICALLY ADDING PROPER NAMES TO A DATABASE

FIELD OF THE INVENTION

The present invention generally relates to adding proper names to a database. More particularly, the present invention relates to automatically adding proper names to a dictionary or other database, after the proper name has been used in an email address.

BACKGROUND OF THE INVENTION

Word processor users have become accustomed to using a spell checker to review an electronic document for spelling errors. Modem email composing application programs (email editors) have been equipped with spelling checkers. One common complaint among computer users is that email addresses are often labeled as spelling errors by the spell checker in either a word processor or an email editor. The user is required to instruct the spell checker to either ignore the proper name or to add the proper name to a custom dictionary. As a result, the spell checking process is less efficient.

Normally, an email editor will "resolve" a partial email name that is typed in the "TO" field of an email form. For example, if a user enters "Montero" in the TO field, then the email editor will check an address book or an email name cache of previously used email addresses and names to find a match. If a match is found, then the email editor will return an email address corresponding to the name (e.g., JMontero@microsoft.com) and will return a display name string (e.g., "José Luis Montero"). The email editor will use the address to transmit the email note to the proper recipient. The display name will be used to replace the name that the user entered into the TO field.

Unfortunately, if the user types the name "Montero" or "José" or "José Luis Montero" in the body of the email note, the email editor's spell checker is likely to label the proper name as a spelling error. This can occur even when the user has entered the proper name (or part of the proper name) in the TO field and the email editor has already resolved the name. Therefore, there is a need in the art for a spell checker that can recognize proper spellings of proper names corresponding to resolved email addresses. The proper names should also be made available to other databases, such as auto-completion and smart tags databases.

SUMMARY OF THE INVENTION

The present invention solves the above needs by storing the spelling of resolved email display names in a custom dictionary. By referring to the custom dictionary during the spell checking process, the names can be recognized and, thus, not incorrectly marked as spelling errors.

When the email editor of the present invention resolves an entered email name, the email editor checks an address book or email name cache to determine whether there is an email address and/or an email display name corresponding to the name. The email editor will return an email address and a display name string corresponding to the entered email name. The email editor will use the address to transmit the email note to the proper recipient. The display name will be used to replace the email name that the user entered into the TO field.

Once an email name has been resolved and the display name is provided in the TO field, the email editor will make the name available for adding to a custom dictionary. Once the display name string has been added to the custom dictionary, the email editor and any other client of the custom dictionary (e.g., a word processor) will recognize the name as being properly spelled. Accordingly, when a user enters the name string into a document, the name will be recognized by any spell checker using the custom dictionary and the name will not be identified as a misspelled word.

In addition, the email editor of the present invention can add the display name string to any other repository of text strings. For example, the names can be added to an "auto-completion" database to provide a text-entry shortcut when the user begins typing the email name. Similarly, the names can be added to a "smart tags" database so that the names can be associated with corresponding information from predetermined data sources.

The various aspects of the present invention may be more clearly understood and appreciated from a review of the following detailed description of the disclosed embodiments and by reference to the drawings and claims.

DETAILED DESCRIPTION

When the email editor of an exemplary embodiment of the present invention resolves a name, the editor checks an address book or email name cache and returns an email address and an email display name corresponding to the name. The email editor will return an email address and a display name string corresponding to the entered email name. The email editor can use the address to transmit the email note to the proper recipient. The display name will be used to replace the email name that the user entered in the TO field.

Once an email name has been resolved and the display name is provided in the TO field, the email editor will make the name available for adding to a custom dictionary. Once the display name string has been added to the custom dictionary, the email editor and any other client of the custom dictionary (e.g., a word processor) will recognize the name as being properly spelled. Accordingly, when a user enters the name string (or a portion thereof) into a document, the name will be recognized by any spell checker using the custom dictionary and the name will not be mis-identified as a misspelled word.

In addition, the email editor of the present invention can add the display name string to any other repository of text strings. For example, the names can be added to an "auto-completion" database to provide a text-entry shortcut when the user begins typing the email name. Similarly, the names can be added to a "smart tags" database so that the names can be associated with corresponding information from predetermined data sources.

Figure 1:
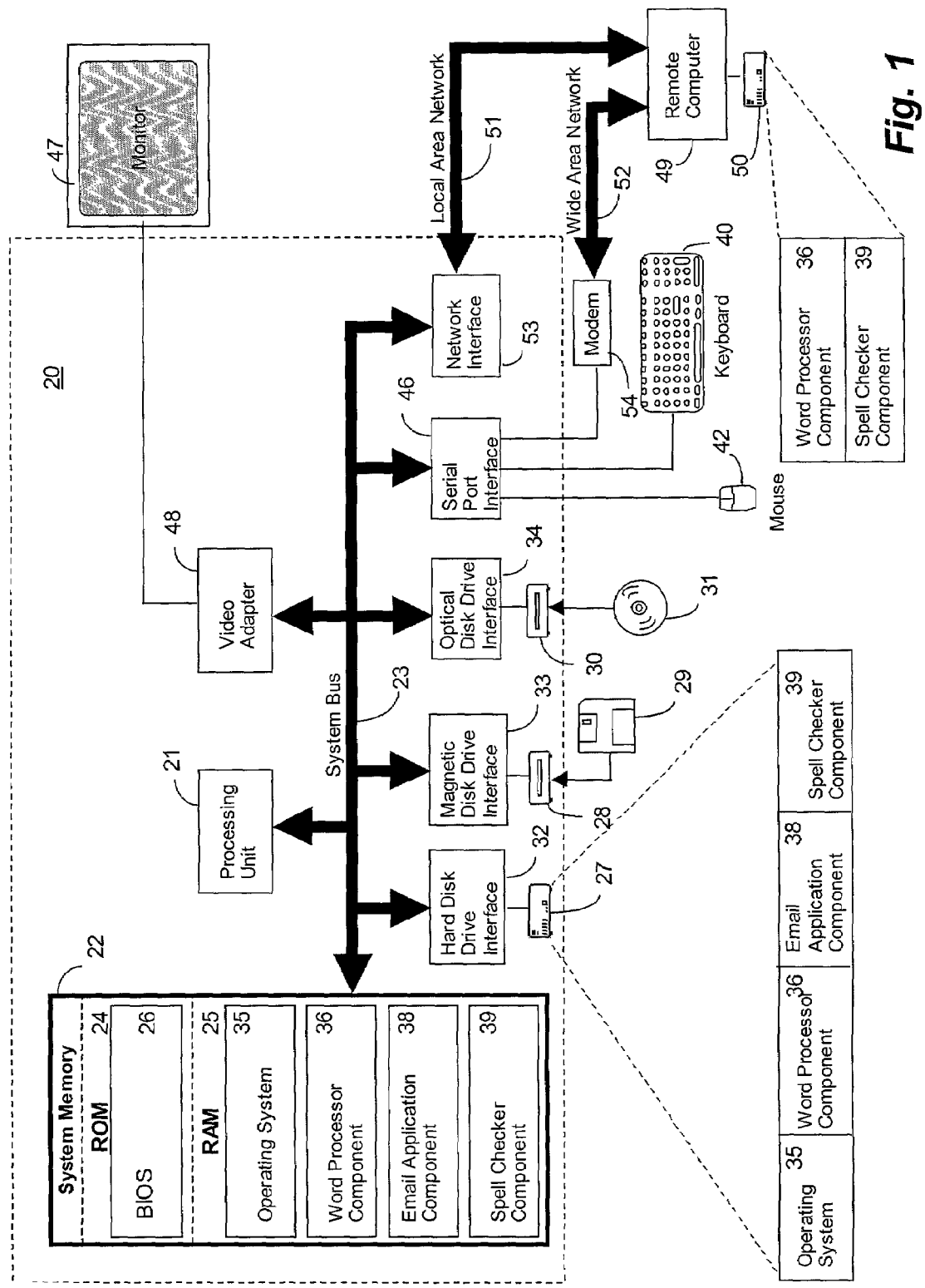
FIG. 1 is a block diagram illustrating an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, the personal computer 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes a read only memory (ROM) 24 and a random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20.

A number of program modules may be stored on hard disk 27, magnetic disk 29, optical disk 31, ROM 24, or RAM 25, including an operating system 35, a word processor component 36, an email application component 38, and a spell checker component 39. Program modules include routines, sub-routines, programs, objects, components, data structures, etc., which perform particular tasks or implement particular abstract data types. Aspects of the present invention may be implemented in the form of a spell checker component 39 that can be incorporated into or otherwise in communication with the word processor component 36 and the email application component 38. The word processor component 36 generally comprises computer-executable instructions for creating or modifying an electronic document. The email application component 38 generally comprises computer-executable instructions for composing and transmitting email messages in the form of email notes. The spell checker component 39 is generally accessible to the word processor component 36 and the email application component 38, but can also be implemented as an integral part of one or both of those components.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
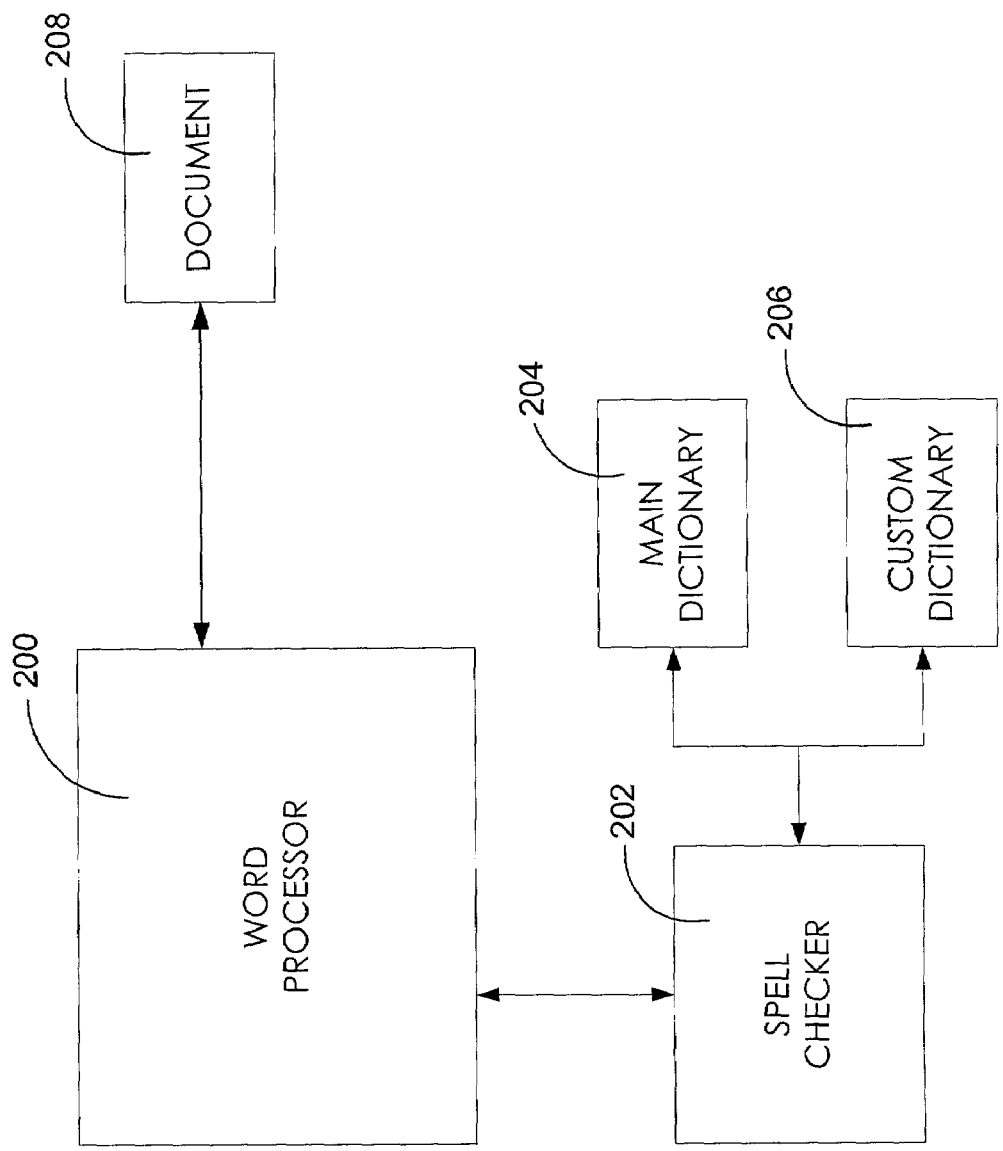
FIG. 2 is a block diagram depicting some of the primary components of a conventional word processor having a spell-checking component.

FIG. 2 is block diagram depicting some of the primary components of a conventional word processor 200 that operates in conjunction with a spell checker 202. The spell checker 202 may be an integral part of the word processor 200 or may be implemented as a separate program module. When the word processor is used to generate and/or edit a document 208, the word processor can check the spelling of the words in the document by using the spell checker 202. The spell checker 202 compares the words in the document 208 to word databases such as a main dictionary 204 and a customer dictionary 206.

Typically, the main dictionary 204 contains a very large list of commonly used words. The word list in the main dictionary 204 might be a large sub-set of the contents of a conventional dictionary. The custom dictionary, on the other hand, is typically empty when the spell checker 202 is first used, unlike the main dictionary 204, which normally contains a preconfigured list of words. A user can add words to the custom dictionary 206 that are not found in the main dictionary 204, but are, nonetheless, correctly spelled. Generally, a user will add specialized words to the custom dictionary 206 that the user commonly uses. The addition of the specialized word to the custom dictionary 206 will cause the spell checker 202 to recognize the specialized word during the spell checking operation.

When the spell checker 202 recognizes a word as correctly spelled, it will not label the word as a misspelled word. Unfortunately, a user must normally take affirmative steps to add a word to a custom dictionary. That is, words are not usually automatically added to the custom dictionary 206. For example, if a user wants to add a specialized word, such as a proper name, to the custom dictionary 206, the user must respond to a prompt during spell checking or select the proper name for addition to the custom dictionary.

Figure 3:
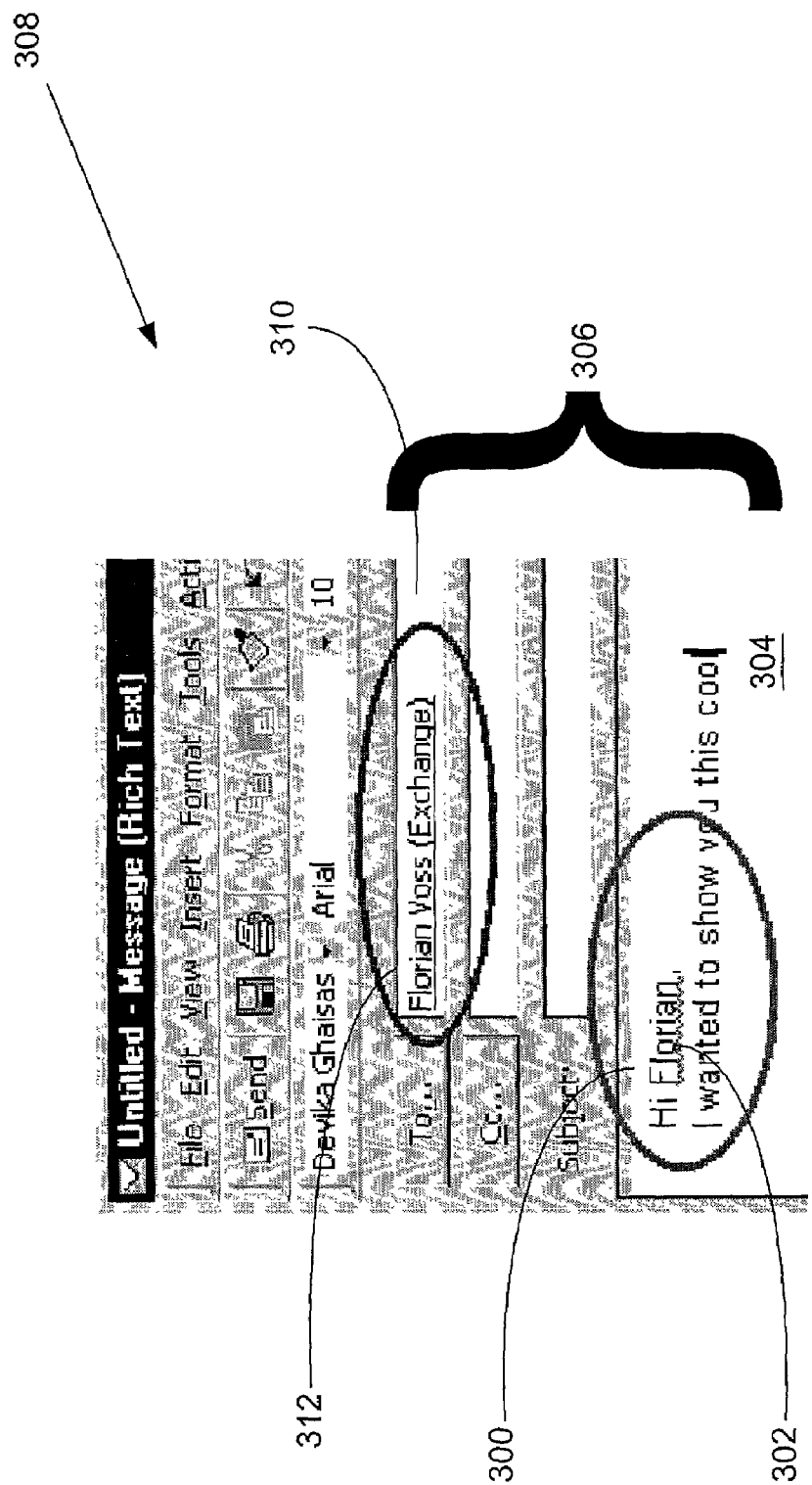
FIG. 3 is a screenshot depicting the operation of a conventional spell-checking component.

FIG. 3 is a computer screenshot depicting the operation of a conventional spell-checking component. In the example of FIG. 3, a spell-checking component has identified a misspelled word 300 that is the proper name "Florian." The misspelled word 300 is identified by a misspelled word indicator 302 that takes a form of a squiggly underline. The misspelled word 300 is located in the body 304 of an email note 306 that is being composed in the context of an email application user interface 308. The misspelled word 300 is labeled as misspelled, because the spell checker (not shown) associated with the email application 308 does not recognize the proper name "Florian." That is, the word "Florian" does not exist in any dictionary associated with the email application.

Notably, the proper name "Florian" has been entered in the "TO" field 310 of the email note 306. In addition, the proper name has been resolved against an address book or other email name database in a conventional manner. The line under the name in the "TO" field 310 indicates that the name has been resolved. Typical email applications have email name resolving modules that resolve email names. Resolving an email name is a well-known technique that provides a short cut for users that are composing an email note. For example, the user may enter either "Florian" or "Voss" and the email application will search an email name database to find the full name and the email address associated with the entered name. The full name is then displayed as a displayed name 312. Underlined displayed names indicate to the user that the email name has been resolved. If an entered name is not underlined, then the entered name has not been resolved.

Figure 4:
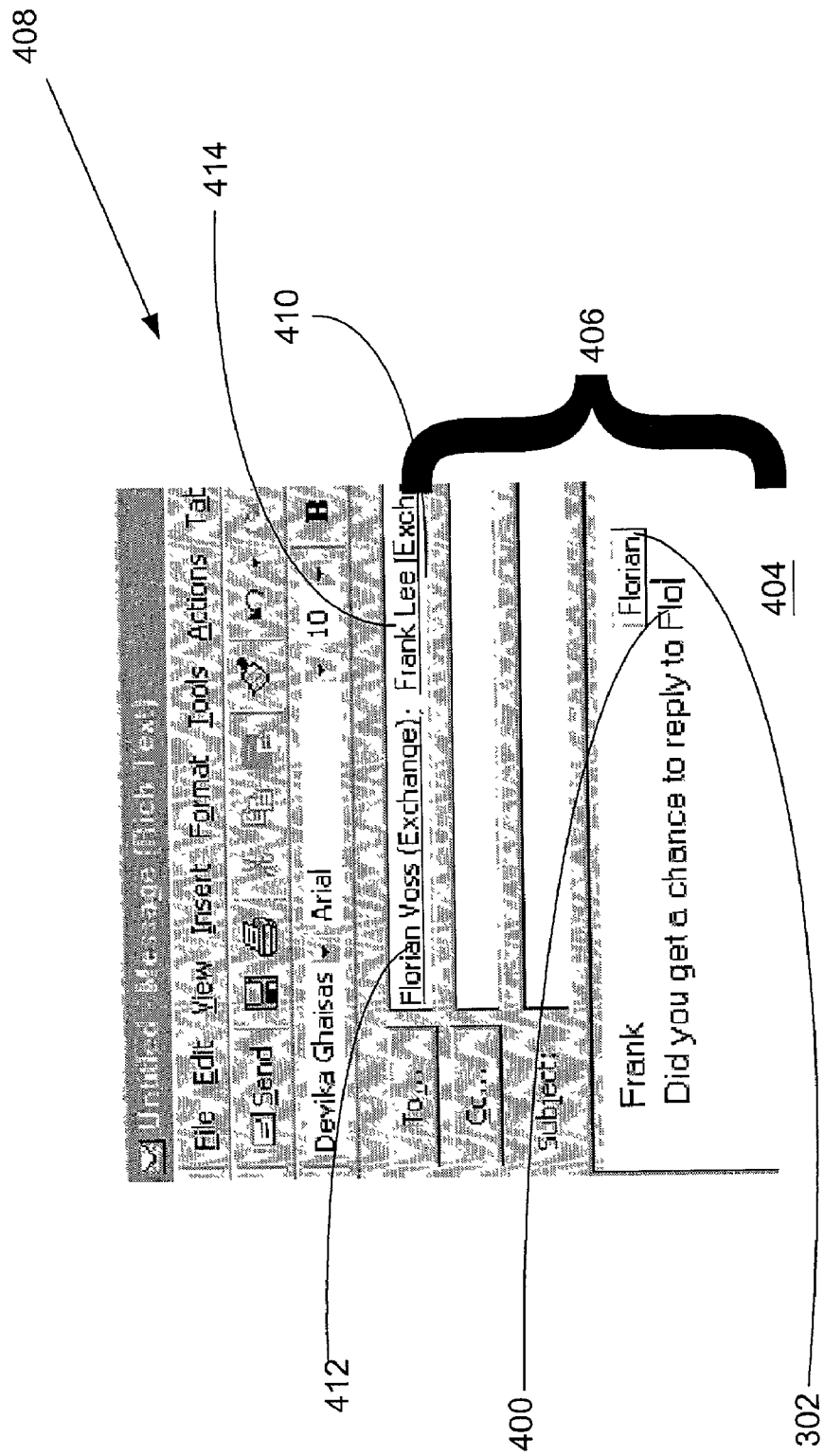
FIG. 4 is a screenshot depicting the operation of a spell-checking component that is an exemplary embodiment of the present invention.

FIG. 4 is a computer screenshot depicting the operation of a spell-checking component that is an exemplary embodiment of the present invention. An email application user interface hosts an email note 406. A displayed name 412, "Florian Voss", is displayed in a "TO" field 410. A second display name 414 is also displayed in the "TO" field 410. Text has been entered into the body 404 of the email note 406. In the example of FIG. 4, the user has entered the proper name "Frank" in the body 404 of the email note 406. Notably, the word "Frank" is not labeled as a misspelled word. This proper name may be in a main dictionary or in another dictionary associated with the email application.

The partial word 400 "Flo" has been entered into the body 404 of the email note 406. In response to the entry of this partial word 404, a tooltip 402 containing the text "Florian" has been displayed. The tooltip has been displayed, because the email application has recognized the partial word 400 that has been entered and has provided a suggested completion of the entered partial word 400. This completion suggestion tooltip 402 is a well-known technique and is generally referred to as "auto-completion."

The spell checking component has recognized the partial word 400 based on the presence of the entire word ("Florian") in the "TO" field 410. In one embodiment of the present invention, proper names will be recognized by the spell checking component when the proper name is also found in the "TO" field of an email note. In an alternative embodiment of the present invention, the spell check will recognize proper names that have been entered in any "TO" field of previously composed email notes. Additionally, an auto-completion module may recognize a partial word from a current or previously entered "TO" field.

Figure 5:
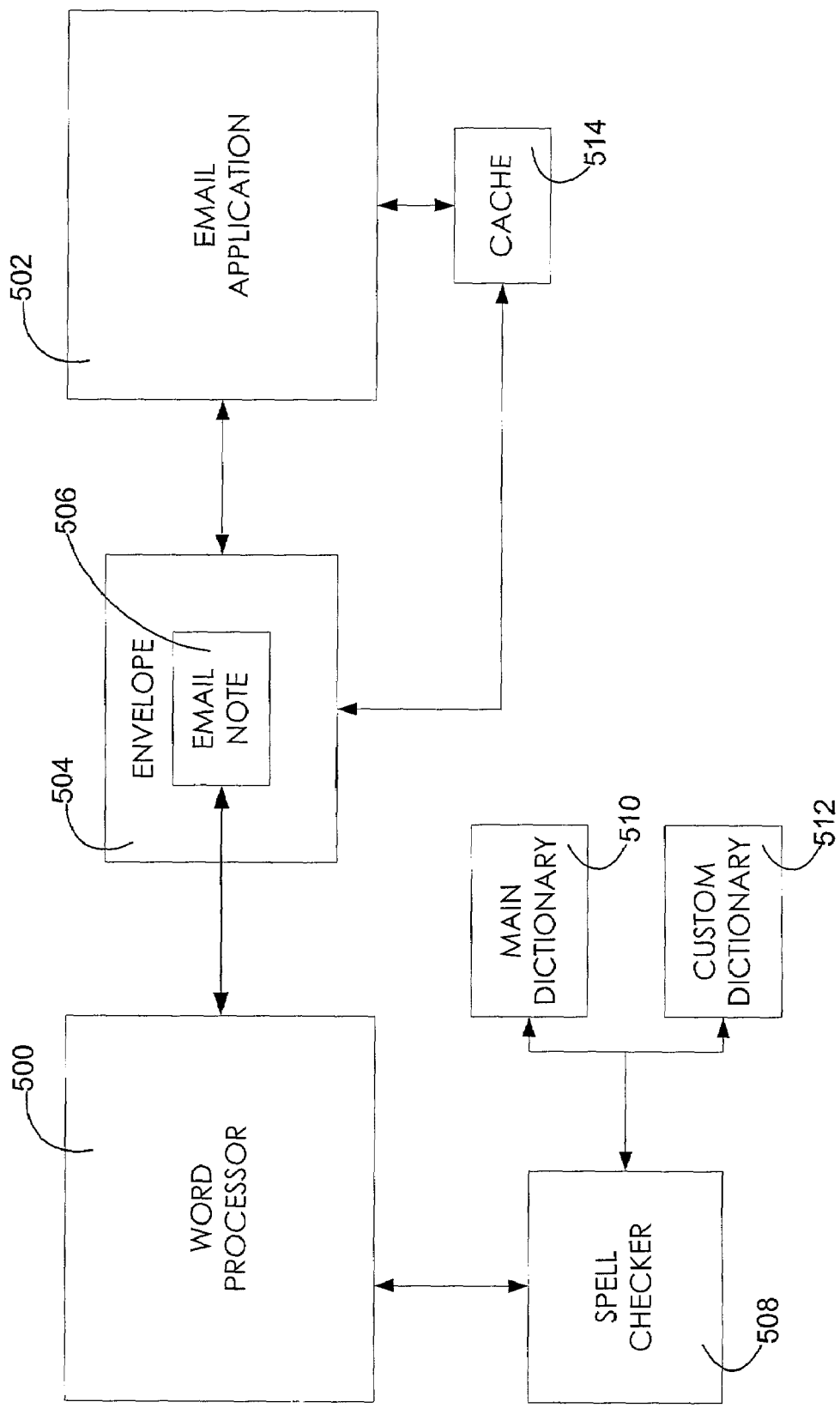
FIG. 5 is a block diagram depicting some of the primary components of a word processor, a spell-checking component, and an email application of an exemplary embodiment of the present invention.

FIG. 5 is a block diagram depicting some of the primary components of an exemplary embodiment of the present invention. A word processor 500 cooperates with an email application 502 to produce an email note 506. An envelope 504 acts as an interface between the word processor 500 and the email application 502. The envelope 504 is an interface component that permits a user of the email application 502 to use functionality of the word processor 500 and vice versa. The envelope 504 is described in more detail in a co-pending U.S. patent application Ser. No. 09/098,778, entitled System and Method for Improved Electronic Mail Processing, also assigned to Microsoft Corporation of Redmond, Wash. That U.S. patent application is hereby incorporated by reference.

When a user composes the email note 506, the user may utilize a user interface hosted by either the word processor 500 or the email application 502. In either case, the text entered into the email note 506 can be checked using a spell checker 508 and any associated dictionaries 510, 512. When an email name is entered into a field of the email note 506 (e.g., the TO field), the name can be resolved by the email application 502 by comparing the email name against an email name cache 514 and providing a displayed name and/or an email address.

As described above in connection with FIG. 4, a proper name can be recognized by the spell checker 508 if the proper name is listed in a dictionary 510, 512 associated with the spell checker. In an exemplary embodiment of the present invention, the email application will add new names to the email name cache 514. New names are email names that are resolved for the first time. When the email application 502 adds a new email name to the email name cache 514, the email application can broadcast a message to other applications, such as the word processor 500, that a new name has been added to the email name cache. Conventional applications are often equipped with message monitors to monitor broadcast messages and to trigger a response to relevant broadcast messages. In response to receiving the broadcast message, the spell checker 508 can add the newly resolved email name to the custom dictionary 512. Thereafter, the newly resolved name will be recognizable by the spell checker 508 as a properly spelled word. Specifically, the spell checker 508 can add the contents of the displayed name associated with the email note 506 to the custom dictionary 512. Of course, the inventors contemplate that any text associated with the new resolved email name could be added to the custom dictionary 512.

Figure 6:
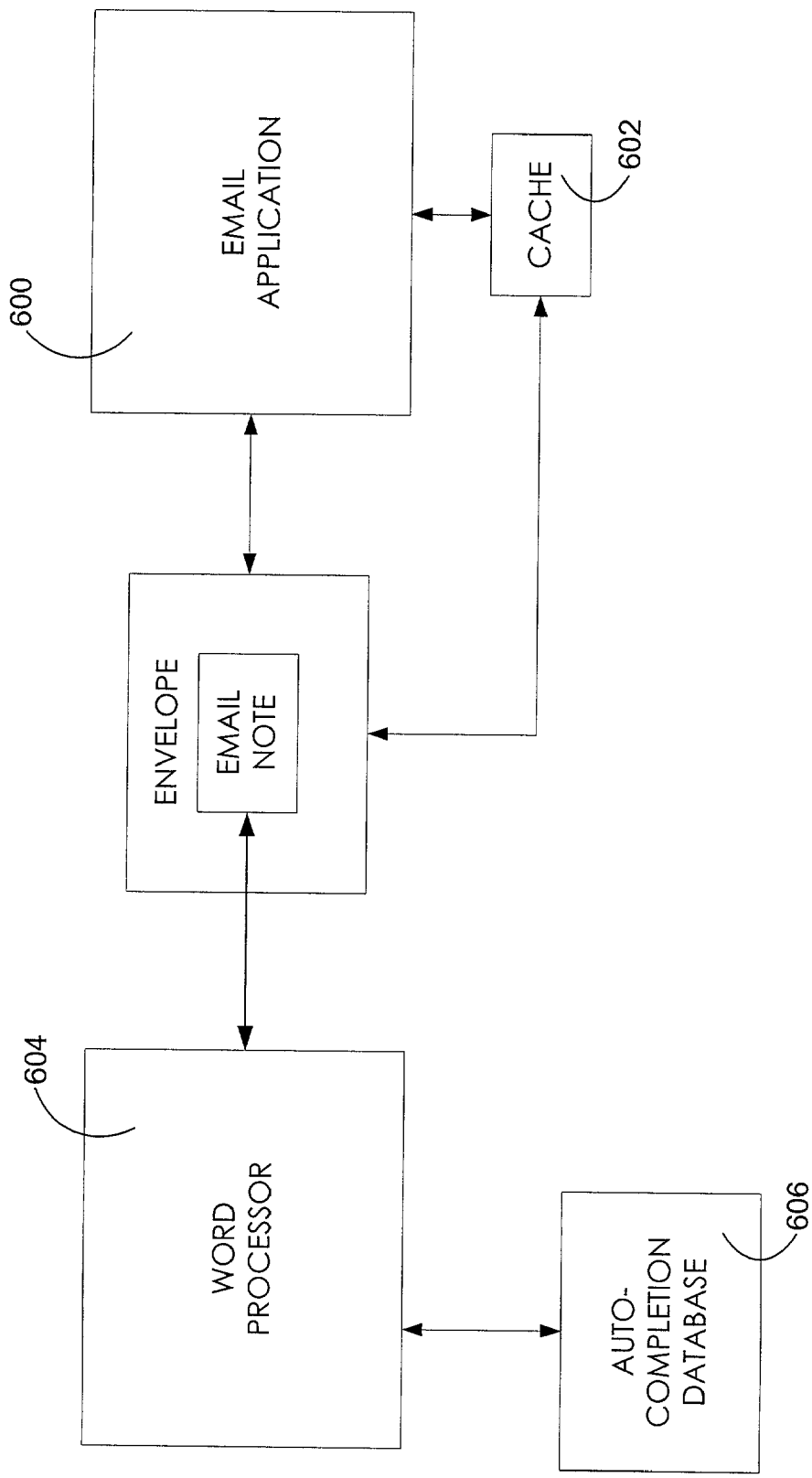
FIG. 6 is a block diagram depicting some of the primary components of a word processor, an auto-complete component, and an email application of an exemplary embodiment of the present invention.

FIG. 6 is a block diagram depicting the primary components of an alternative embodiment of the present invention. In the embodiment of FIG. 6, an email application 600 broadcasts a message to other applications and/or program modules that a newly resolved email name has been added to an email name cache 602. When the broadcast message is received by the word processor 604, the text associated with the newly resolved email name can be added to an auto-completion database 606 by an auto-completion module (not shown). As described in connection with FIG. 4, the addition of the email name to the auto-completion database 606 enables the recognition of word parts for which tooltips can be provided. The provided tooltips will include the text associated with one or more parts of an email name that has been placed in the auto-completion database 606.

Figure 7:
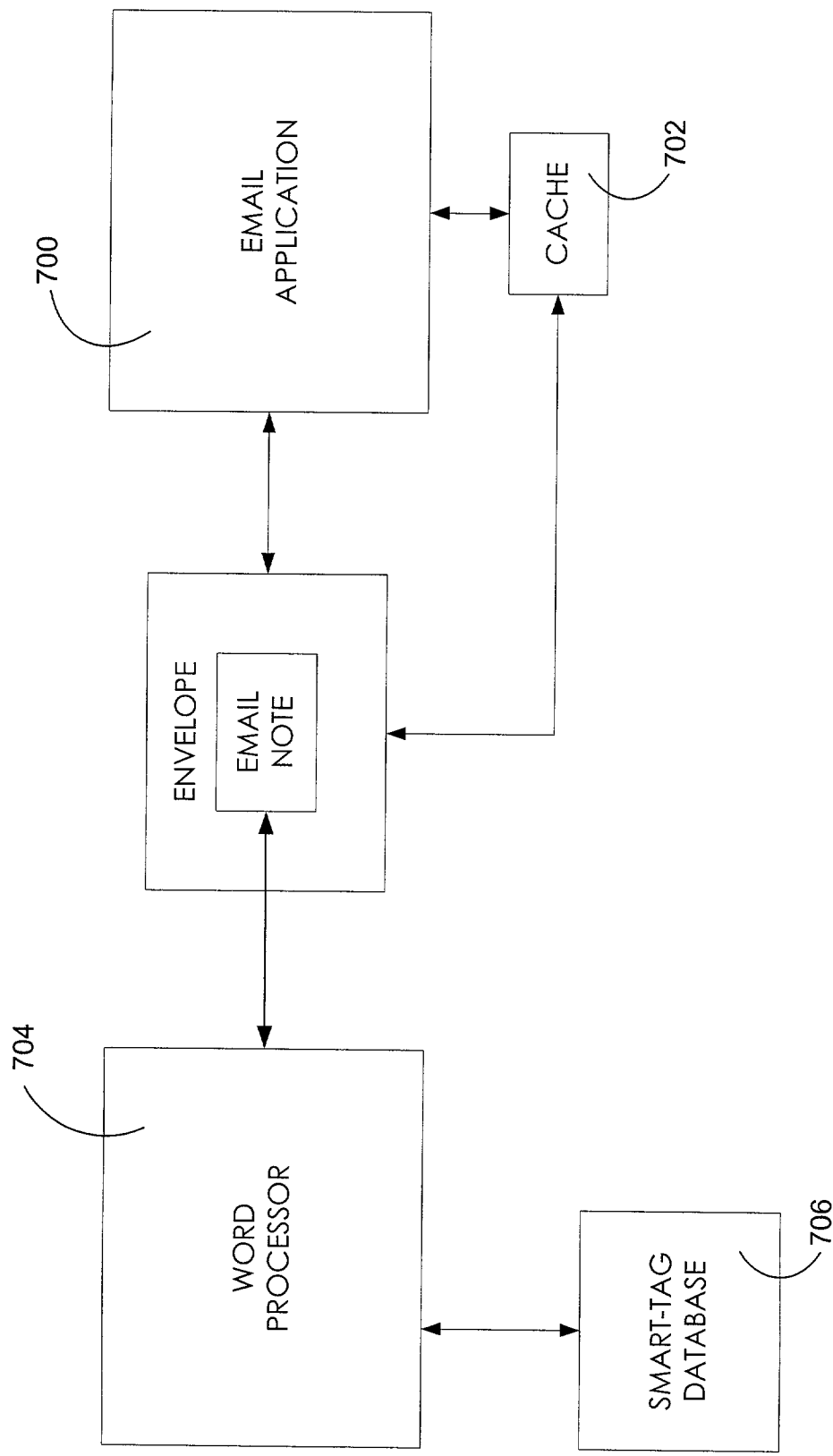
FIG. 7 is a block diagram depicting some of the primary components of a word processor, a factoid component, and an email application of an exemplary embodiment of the present invention.

FIG. 7 is a block diagram depicting the primary components of another alternative embodiment of the present invention. When the email application 700 has a newly resolved name to the email name cache 702 and broadcasts a message notifying other applications of this event, the word processor 704 can add the newly resolved name to a smart-tags database 706 by a smart-tags module (not shown). Smart-tags are predefined text strings to which available data can be associated. When, for example, a user types a text string that is contained in the smart-tags database 706, the text string can be recognized (i.e., found in the smart-tags database) and the associated data can be provided to the user. Smart-tags can be used to help users easily access information from the Internet or from other applications. If a contact name is typed in a word processor document, for example, a smart-tag can be displayed to provide the user with an option to automatically insert the contact's address that may be stored in an address book. Similarly, if a stock symbol is typed into a document, a smart-tag could be displayed providing the user with an option to access information about the stock from the Internet. A more detailed description of smart-tags can be found in the co-pending U.S. patent application Ser. No. 09/588,411, also assigned to Microsoft Corporation of Redmond, Wash., which is hereby incorporated by reference.

By adding the resolved names from the email name cache 702, this embodiment of the present invention automatically fills the smart-tags database 706 with the email names that the user is most likely to desire to have associated with smart-tags data. Those skilled in the art will appreciate that the embodiments described in FIGS. 5–7 can be combined into a single embodiment. That is, the automatic addition of email names to a custom dictionary, and auto-completion database, and a smart-tags database can be accomplished substantially simultaneously.

Figure 8:
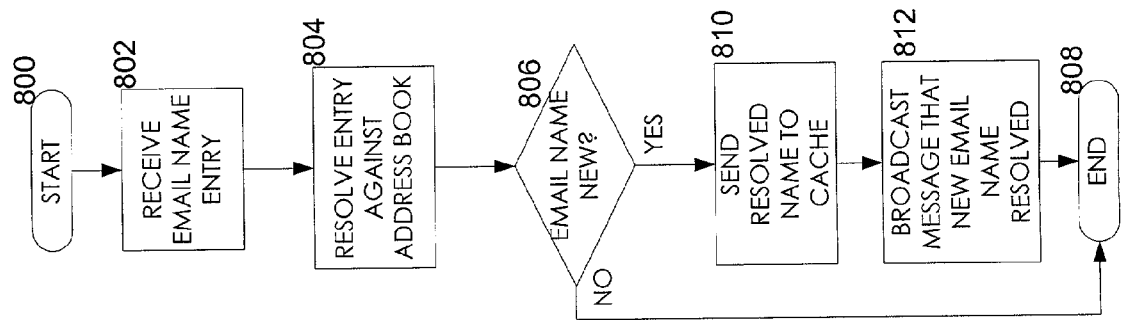
FIG. 8 is a flowchart depicting an exemplary method for broadcasting a notification of the addition of a new email name to an email name cache.

FIG. 8 is a flow chart depicting an exemplary method for broadcasting a notification of the addition of a new email name to an email name cache. The method of FIG. 8 begins at step 800 and proceeds to step 802. At step 802, the email name entry is received. This step may be accomplished by an email application user entering a name or portion of a name into the TO field of an email note. The method then proceeds to step 804. At step 804, the email name entry is resolved against an address book.

As described above in connection with FIGS. 4 and 5, resolving an email name entry against an address book is a well-known technique. Generally, resolving an email name involves comparing an entered text string to a table of email names to find a match. When a match is found, a displayed name and an email address can be retrieved from the table for use by the email application. The email application can display the text of the display name and can use the email address for transmitting the email note to the proper recipient. Of course, the entered name may also be resolved against an email name cache.

The method proceeds from step 804 to decision block 806. At decision block 806, a determination is made as to whether the email name is a new email name. If the email name is not a new email name (e.g., the name is found in an email name cache or address book), then the method branches to step 808 and ends. If, on the other hand, the email name is a new email name, the method proceeds to step 810. At step 810, the resolved name is sent to the email name cache. The method then proceeds to step 812. At step 812, a message is broadcast that the new email name has been resolved and stored in the email name cache. The method then proceeds to step 808 and ends.

Figure 9:
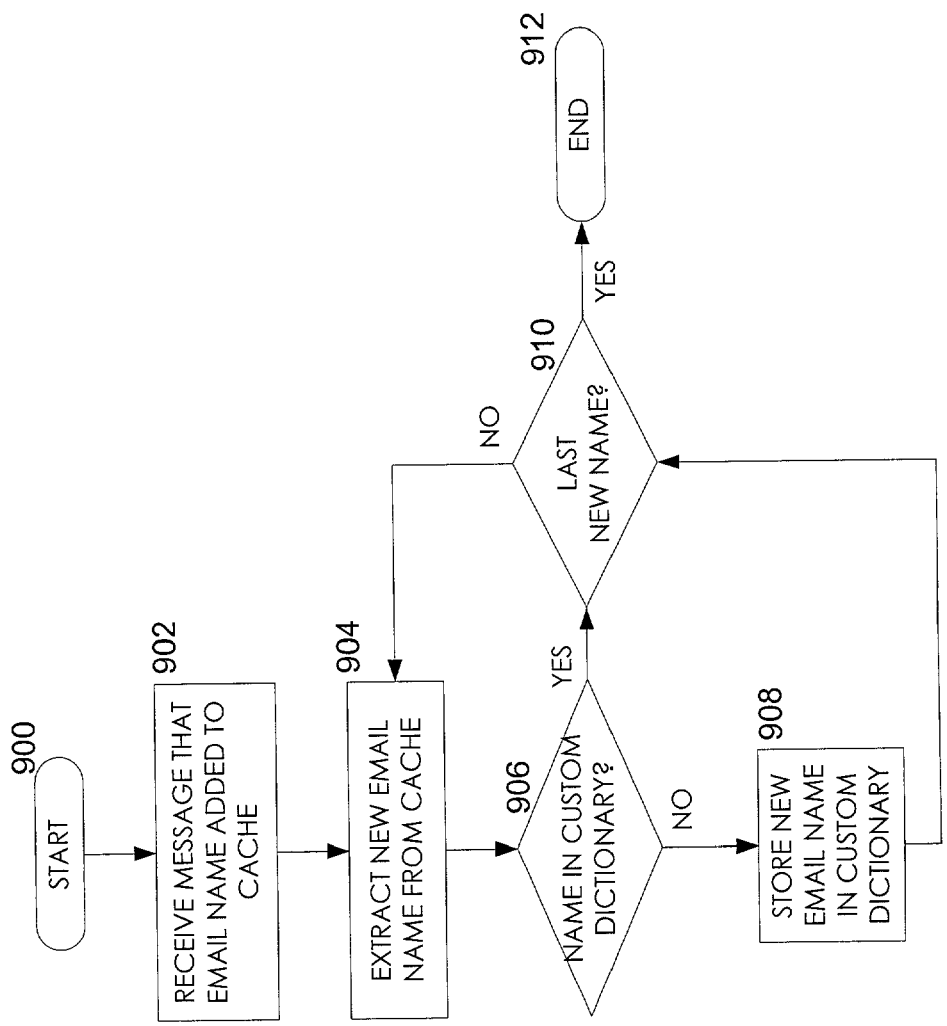
FIG. 9 is a flowchart depicting an exemplary method for adding a new email name to a custom dictionary.

FIG. 9 is a flow chart depicting an exemplary method for adding a new email name to a dictionary. The method of FIG. 9 starts at 900 and proceeds to step 902. At step 902, a message is received that an email name has been added to the email name cache. The method then proceeds to step 904. At step 904, the new email name is extracted from the email name cache.

The method proceeds from step 904 to decision block 906. At decision block 906 a determination is made as to whether the name is found in a custom dictionary. If the name is not found, then the method branches to step 908 and the new email name is stored in the custom dictionary. The method then proceeds to step 910. On the other hand, if at decision block 906 it is determined that the name is found in the custom dictionary, the method branches to decision block 910. At decision block 910, a determination is made as to whether the last new name has been extracted from the email name cache. If the last new name has been extracted from the email name cache, then the method proceeds to step 912 and ends. If at decision block 910, it is determined that the last new name has not yet been extracted from the email name cache, the method branches to step 904 and the next new email name is extracted from the email name cache. The method then proceeds as described above.

Figure 10:
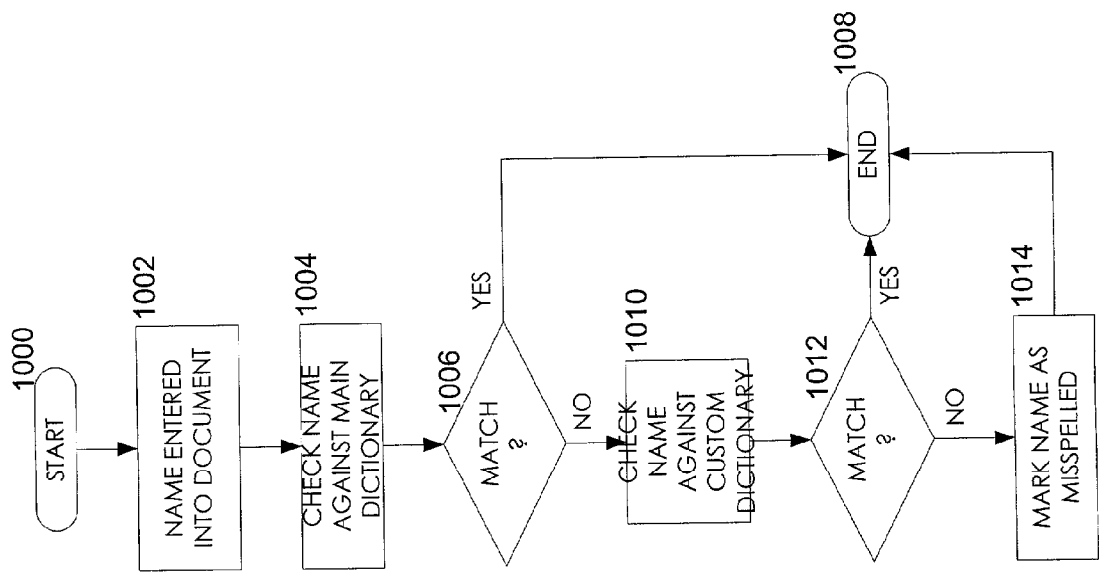
FIG. 10 is a flowchart depicting an exemplary method for determining whether a proper name should be labeled as misspelled.

FIG. 10 is a flow chart depicting an exemplary method for determining whether a proper name should be labeled as misspelled. The method of FIG. 10 starts at step 1000 and proceeds to step 1002. At step 1002, a name is entered into a document. This step may be performed when a user types a proper name into a word processor document. The method then proceeds to step 1004 and the entered name is checked against a main dictionary.

The method proceeds from step 1004 to decision block 1006. At decision block 1006, a determination is made as to whether the name matches a word in the main dictionary. If a match exists, the method branches to step 1008 and ends. On the other hand, if a match does not exist, the method branches to step 1010.

At step 1010, the name is checked against a custom dictionary. The custom dictionary may be any dictionary to which names and/or other specialized words may be added by a user or by an automated method. The method proceeds from step 1010 to decision block 1012. At decision block 1012, a determination is made as to whether a match exists between the entered name and the word list in the custom dictionary. If a match exists, then the method branches to step 1008. If, on the other hand, a match does not exist, then the method branches to step 1014. At step 1014, the name is labeled as being misspelled in the document. The method then proceeds to step 1008.

Advantageously, the exemplary embodiments of the present invention provide for the automatic addition of email names to dictionaries and other databases. Those skilled in the art will appreciate that the steps described in FIGS. 9 and 10 in connection with a spell checker and custom dictionary can be implemented for adding and checking a name against an auto-completion database, a smart-tags database, and any other database to which text strings may be added and accessed.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for recognizing the correct spelling of a word associated with an email application, the method comprising:
   receiving an indication that an email name has been entered into a first field;
   resolving the email name to a display name, automatically adding the display name to a custom dictionary and at least one module consisting essentially of a spell checker module, auto-completion module, and a smart-tags module if the display name is identified as a new word;
   receiving an indication that text associated with the display name has been entered into a body of an application;
   comparing the text associated with the display name to a word list;
   indicating that the text associated with the display name is correctly spelled in response to finding a match between the text associated with the display name and the word list; and
   indicating that the text associated with the display name is incorrectly spelled in response to failing to find a match between the text associated with the display name and the word list.

2. The method of claim 1, wherein the text associated with the display name is a proper name.

3. The method of claim 1, wherein the display name is a proper name.

4. The method of claim 1, further comprising:
   comparing the email name to an email name list;
   finding a matching name in the email name list, the matching name sharing at east one characteristic with the email name; and
   determining the display name associated with the matching name.

5. The method of claim 4, further comprising determining an email address associated with the matching name.

6. The method of claim 5, further comprising determining that the email name has been entered into a TO field of an email note.

7. The method of claim 4, further comprising storing the display name in the word list.

8. The method of claim 7, wherein the word list is a dictionary.

9. A computer-readable medium having stored thereon computer-executable instructions for performing a method of recognizing the correct spelling of a word associated with an email application, the method comprising:
   receiving an indication that an email name has been entered into a first field;
   resolving the email name to a display name;
   automatically adding the display name to a custom dictionary and at least one module consisting essentially of a spell checker module, auto-completion module, and a smart-tags module if the display name is identified as a new word;
   receiving an indication that text associated with the display name has been entered into a body of an application;
   comparing the text associated with the display name to a word list;
   indicating that the text associated with the display name is correctly spelled in response to finding a match between the text associated with the display name and the word list; and
   indicating that the text associated with the display name is incorrectly spelled in response to failing to find a match between the text associated with the display name and the word list.

10. The computer-readable medium of claim 9, wherein the text associated with the display name is a proper name.

11. The computer-readable medium of claim 9, wherein the display name is a proper name.

12. The computer-readable medium of claim 9, the method further comprising:
   comparing the email name to an email name list;
   finding a matching name in the email name list, the matching name sharing at least one characteristic with the email name; and
   determining the display name associated with the matching name.

13. The computer-readable medium of claim 12, the method further comprising determining an email address associated with the matching name.

14. The computer-readable medium of claim 13, the method further comprising determining that the email name has been entered into a TO field of an email note.

15. The computer-readable medium of claim 9, the method further comprising storing the display name in the word list.

16. The computer-readable medium of claim 15, wherein the word list is a dictionary.

17. A system comprising a processor and memory configured to perform a method of recognizing the correct spelling of a word associated with an email application, the method comprising:
   receiving an indication that an email name has been entered into a first field;
   resolving the email name to a display name;
   automatically adding the display name to a custom dictionary and at least one module consisting essentially of a spell checker module, auto-completion module, and a smart-tags module if the display name is identified as a new word;
   receiving an indication that text associated with the display name has been entered into a body of an application;
   comparing the text associated with the display name to a word list;

indicating that the text associated with the display name is correctly spelled in response to finding a match between the text associated with the display name and the word list; and indicating that the text associated with the display name is incorrectly spelled in response to failing to find a match between the text associated with the display name and the word list.

18. The system, of claim 17, wherein the text associated with the display name is a proper name.

19. The system of claim 17, wherein the display name is a proper name.

20. The system of claim 17, wherein the method further comprises:
comparing the email name to an email name list;
finding a matching name in the email name list, the matching name sharing at least one characteristic with the email name; and
determining the display name associated with the matching name.

21. The system of claim 20, wherein the method further comprises determining an email address associated with the matching name.

22. The system of claim 21, wherein the method further comprises determining that the email name has been entered into a TO field of an email note.

23. The system of claim 17, wherein the method further comprises storing the display name in the word list.

24. The system of claim 23, wherein the word list is a dictionary.

\* \* \* \* \*